| (12) | United States Patent<br>Isoaho | (10) Patent No.: US 10,662,921 B2<br>(45) Date of Patent: May 26, 2020 |
|---|---|---|

(54) SYSTEM AND METHOD FOR HARNESSING WIND ENERGY

(71) Applicant: BIGFIELD Tmi, Oulu (FI)

(72) Inventor: Markku Isoaho, Oulu (FI)

(73) Assignee: BIGFIELD TMI, Oulu (FI)

( * ) Notice: Subject to any disclaimer, the term of this patent is extended or adjusted under 35 U.S.C. 154(b) by 223 days.

(21) Appl. No.: 15/768,537

(22) PCT Filed: Oct. 14, 2016

(86) PCT No.: PCT/FI2016/000025
§ 371 (c)(1),
(2) Date: Apr. 14, 2018

(87) PCT Pub. No.: WO2017/064363
PCT Pub. Date: Apr. 20, 2017

(65) Prior Publication Data
US 2018/0306168 A1    Oct. 25, 2018

Related U.S. Application Data

(60) Provisional application No. 62/241,777, filed on Oct. 15, 2015.

(51) Int. Cl.
| F03D 5/02 | (2006.01) |
| F03D 9/43 | (2016.01) |
| B61B 11/00 | (2006.01) |
| B61B 12/00 | (2006.01) |

(52) U.S. Cl.
CPC ............... *F03D 5/02* (2013.01); *B61B 11/00* (2013.01); *B61B 12/00* (2013.01); *F03D 9/43* (2016.05); *B61B 11/002* (2013.01); *F05B 2220/706* (2013.01); *F05B 2240/917* (2013.01); *Y02B 10/30* (2013.01); *Y02E 10/70* (2013.01); *Y02E 10/725* (2013.01); *Y02E 10/728* (2013.01)

(58) Field of Classification Search
CPC ..... F03D 5/02; F03D 5/04; F03D 9/43; B61B 11/00; B61B 11/002; F05B 2220/706; F05B 2240/917
USPC .............................. 104/173.1, 173.2; 290/55
See application file for complete search history.

(56) References Cited

U.S. PATENT DOCUMENTS

| 2,152,235 | A | * | 3/1939 | Curran | .................... | B61B 11/00<br>104/180 |
|---|---|---|---|---|---|---|
| 2,704,038 | A | * | 3/1955 | Horton | .................... | B61B 11/00<br>104/173.2 |
| 4,124,182 | A | * | 11/1978 | Loeb | ........................ | F03D 5/00<br>244/153 R |
| 4,303,834 | A | * | 12/1981 | Li | ............................ | F03D 5/02<br>290/55 |
| 4,350,474 | A | * | 9/1982 | Murphy | .............. | F03B 13/1835<br>415/5 |

(Continued)

FOREIGN PATENT DOCUMENTS

| CN | 202827573 | 3/2013 |
| CN | 103448734 | 12/2013 |

(Continued)

*Primary Examiner* — Zachary L Kuhfuss
(74) *Attorney, Agent, or Firm* — Jacob Eisenberg

(57) ABSTRACT

The invention utilizes a ski lift for wind power generation outside of the ski season. The carriers on the ski lift are replaced by wind catching structures that pull the haul rope either uphill or downhill, depending on the prevailing wind. The haul rope rotates the electrical drive motor of the ski lift, causing it to generate electrical energy.

10 Claims, 2 Drawing Sheets

(56) References Cited

U.S. PATENT DOCUMENTS

| | | | | |
|---|---|---|---|---|
| 4,756,666 A * | 7/1988 | Labrador | | F03D 5/04 415/5 |
| 4,859,146 A * | 8/1989 | Labrador | | F03D 5/04 416/8 |
| 6,072,245 A * | 6/2000 | Ockels | | F03D 5/02 290/55 |
| 6,498,402 B2 * | 12/2002 | Saiz | | F03D 5/02 290/54 |
| 7,188,808 B1 * | 3/2007 | Olson | | F03D 5/00 244/153 R |
| 7,902,684 B2 * | 3/2011 | Davison | | F03B 17/064 290/44 |
| 8,018,079 B2 * | 9/2011 | Kelly | | F03D 5/04 290/1 R |
| 8,102,069 B2 * | 1/2012 | Steelman | | F03B 17/066 290/44 |
| 8,400,002 B2 * | 3/2013 | Gagnon | | F03B 17/066 290/43 |
| 8,441,141 B1 * | 5/2013 | Ouellette | | F03D 5/02 290/55 |
| 8,561,398 B2 * | 10/2013 | Capone | | F03B 17/066 60/398 |
| 9,452,721 B2 * | 9/2016 | Mackin | | B60R 16/03 |
| 2008/0210826 A1 * | 9/2008 | Ockels | | B63B 35/7979 244/155 A |
| 2013/0202435 A1 * | 8/2013 | Beaudoin | | F03D 5/02 416/7 |
| 2018/0156195 A1 * | 6/2018 | Davison | | F03D 5/04 |
| 2018/0306168 A1 * | 10/2018 | Isoaho | | B61B 11/00 |

FOREIGN PATENT DOCUMENTS

| | | |
|---|---|---|
| EP | 0841480 | 5/1998 |
| WO | 2011044130 | 4/2011 |

* cited by examiner

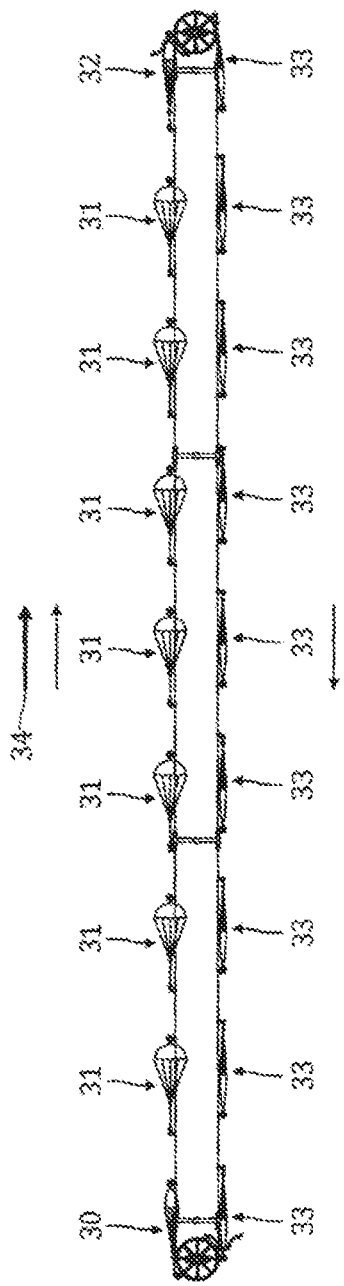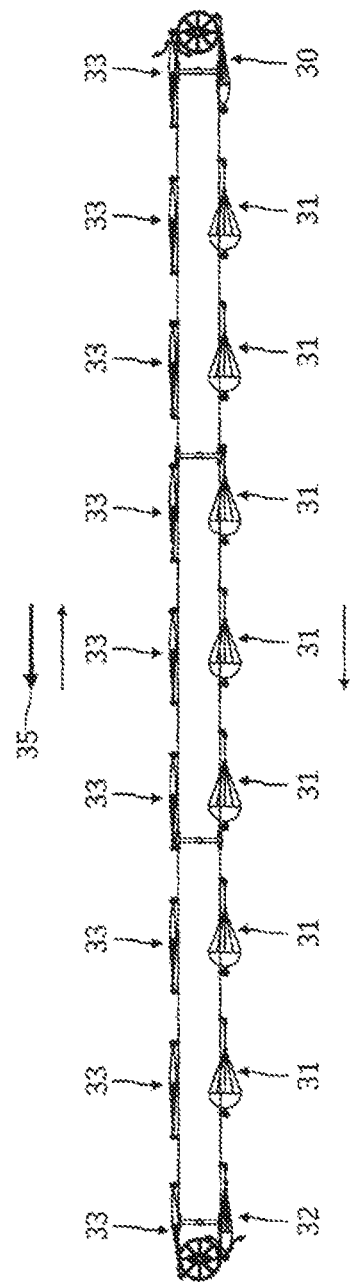
FIG. 3A
FIG. 3B

SYSTEM AND METHOD FOR HARNESSING WIND ENERGY

The invention relates to a system and a method for harnessing wind energy.

BACKGROUND

Ski lifts require a lot of energy to operate. However, for the better part of the year they stand idle, serving no purpose. During this idle time the ski lifts could be put to use in wind energy production. Ski lifts typically run from 500 to 1,000 hours a year. Considering that a year consists of 8,760 hours, their utilization rate stands at a low 10 percent or so.

It is a known fact that ski slopes are relatively windy, making exploitation of wind energy in these areas highly practical. Furthermore, harnessing wind energy on ski slopes is ecologically sound as it offsets their detrimental effect on the landscape.

To date, no solutions have emerged to the high power consumption and off-season inactivity of ski lifts. It should be noted that while aerial lifts, which carry passengers on chairs and in gondolas, find limited use in the summertime and outside of the ski season in general, the simpler surface lifts, which tow skiers and snowboarders uphill, off-season reuse is not an option.

The idea was born during the development of various wind turbine models, when their applicability to ski resorts and ski lifts was considered.

SUMMARY

The object of the invention is a solution that can significantly reduce the disadvantages and drawbacks of the prior art. In particular, the object of the invention is a solution that allows using existing structures for wind power harnessing.

The objects of the invention are attained with an arrangement that is characterised by what is stated in the independent patent claims. Some advantageous embodiments of the invention are disclosed in the dependent claims.

The invention utilizes a ski lift for wind power generation outside of the ski season. The carriers on the ski lift are replaced by drogue parachutes that pull the haul rope either uphill or downhill, depending on the prevailing wind. The parachutes open in a tailwind and when facing a headwind, recoiling rope mechanisms keeps them closed. The haul rope rotates the electrical drive motor of the ski lift, causing it to generate electrical energy.

The system comprises the parachute assemblies and the additional structures that are required to reconfigure a conventional ski lift as a wind-driven electrical generator. The changes required to the actual ski lift structures are kept to a minimum. The parachutes and the other add-on structures are dimensioned to suit existing structures. As a variation, the parachutes can be replaced by sail or wing-like structures, similar to those on sailboats and aircraft.

One embodiment of the invention is a system for harnessing windpower. In one advantageous embodiment of the invention the system comprises a skilift having a haul rope and carriers, and the ski lift is arranged to be modified by replacing the carriers at least partly by wind catching structures that are arranged to move the haul rope when wind effects to at least some of the wind catching structures. The system further comprises a generator and the haul rope is connected to the generator and the moving haul rope is arranged to transfer mechanical energy to the generator that is arranged to produce electrical energy.

In one embodiment of the apparatus according to the invention, the generator is an electric motor of the skilift.

In a second embodiment of the apparatus according to the invention the wind catching structures are arranged to be foldable or otherwise modifiable when the haul rope brings the wind-catching structures to a position where they are at least partly against the wind.

In a third embodiment there is at both ends of the skilift a bullwheel or similar structure and near the bullwheels there are arrangements for closing the wind-catching structures before the haul rope brings the wind-catching structures around their turning points.

In a fourth embodiment of the system according to the invention, the haul rope is arranged to move in one direction regardless of the wind direction and the wind-catching structures are arranged to catch wind where the haul rope that moves the haul rope in the said direction.

In a fifth embodiment of the system according to the invention, the haul rope is arranged to move in both directions and the direction of the haul rope is the direction where the wind-catching structures are arranged to catch the biggest amount of wind power.

In a sixth embodiment of the system according to the invention, the wind catching structures are parachutes, sails or rigid wingsail constructions or combinations thereof.

In a seventh embodiment of the system according to the invention, the parachutes are arranged to be open when in a tailwind and to be closed when facing a headwind.

In an eighth embodiment of the system according to the invention, the wind-catching structures are arranged to go up in a first position to go down in a second position or vice versa and the choosing of the position depends the direction of the wind.

A method for harnessing windpower according to an embodiment uses steps where a skilift comprising a haul rope and carriers is modified by replacing said carriers by wind-catching structures, when wind blows, at least some of the wind-catching structures are moved by the wind and the wind-catching structures moved by the wind move the haul rope and the moving haul rope rotates a generator that produces electricity.

BRIEF DESCRIPTION OF THE FIGURES

In the following, the invention is described in detail. The description refers to the accompanying drawings, in which FIG. 3A illustrates the ski lift from FIG. 2B in its entirety, while capturing wind energy when the wind is blowing uphill, and FIG. 3B illustrates the ski lift from FIG. 2B in its entirety, while capturing wind energy when the wind is blowing downhill,

DETAILED DESCRIPTIONS

The embodiments in the following description are given as examples only and someone skilled in the art can carry out the basic idea of the invention also in some other way than what is described in the description. Though the description may refer to a certain embodiment or embodiments in several places, this does not mean that the reference would be directed towards only one described embodiment or that the described characteristic would be usable only in one described embodiment. The individual characteristics of two or more embodiments may be combined and new embodiments of the invention may thus be provided.

Figure 1:
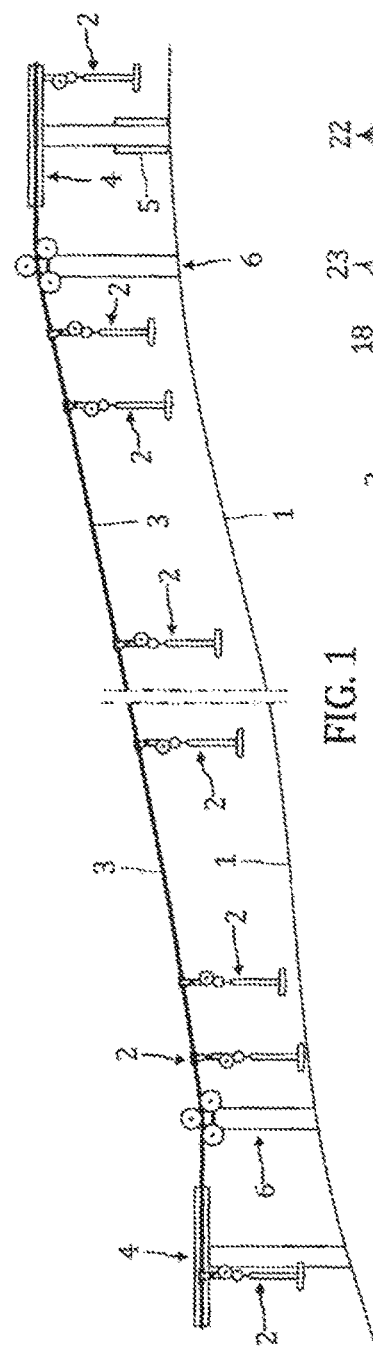
FIG. 1 depicts a conventional ski lift, more specifically a surface lift of the platter type.

The purpose of a conventional surface ski lift, as shown in FIG. 1, is to tow skiers up a slope (1). To this end, carriers (2)—in this picture, by way of an example, of the platter type—are clamped to a haul rope (3) and move uphill on one side of the ski lift and return down on the other side. The haul rope loops around two bullwheels (4), one at the top and the other at the bottom. An electrical motor (5) drives the top bullwheel, providing motion for the haul rope. In-line towers (6) support and hold down the haul rope.

Figure 2A:
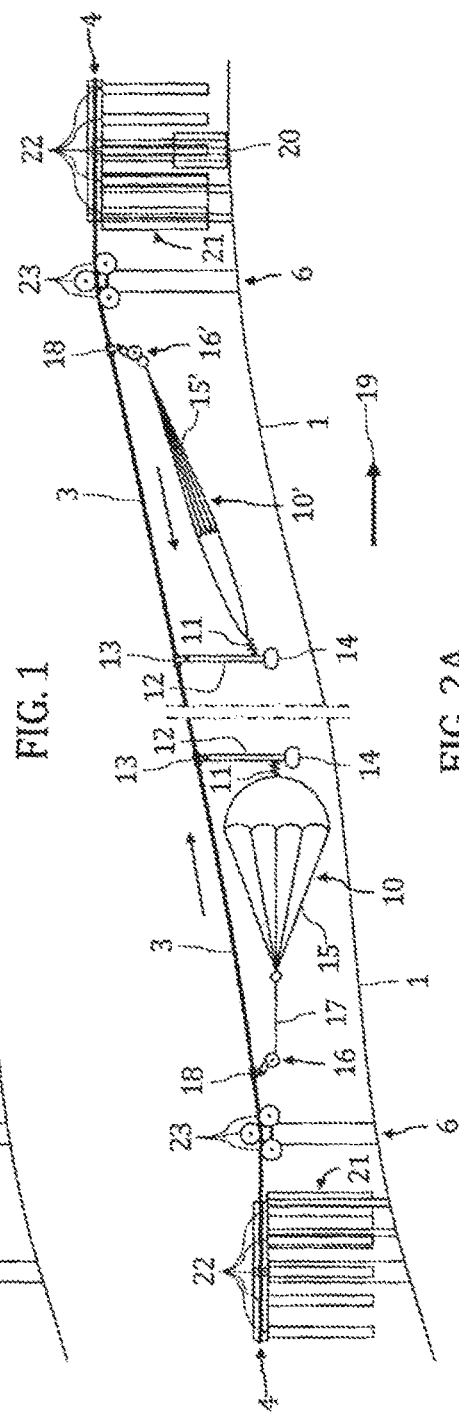
FIG. 2A shows a side view of the ski lift from FIG. 1, reconfigured for capturing wind energy.
Figure 2B:
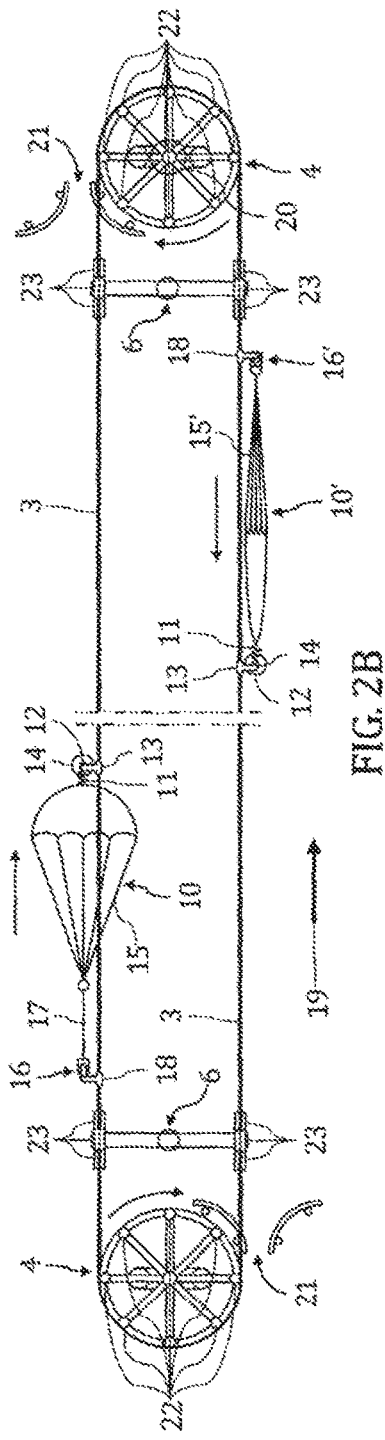
FIG. 2B shows a top view of the ski lift from FIG. 1, reconfigured for capturing wind energy.

The embodiment, depicted in FIG. 2A, from the side and in FIG. 2B from the top, is based on the conventional ski lift pictured in FIG. 1. A drogue parachute (10) is connected at its apex with a spring coil (11) to a vertical bar (12) that swivels from a fixed grip (13). The grip is clamped to the haul rope (3). A weight (14) located at the bottom of the bar keeps the bar upright at all times. The shroud lines (15) of the parachute are connected to a recoiling rope mechanism (16) that winds and unwinds a rope (17) under spring action, similar to when the said mechanism is connected to a carrier in normal ski lift operation. The recoiling rope mechanism is fixed to the haul rope with a fixed grip (18).

When the wind blows uphill (19), the left drogue parachute (10) deploys under the influence of the wind, pulling out the rope (17) from inside the recoiling rope mechanism (16). The force exerted by the parachute is transferred through the haul rope (3) to the electric generator (20), causing it to rotate and produce electrical energy.

The right parachute (10'), which travels against the wind and downward is held in a collapsed, low-drag state by its spring-loaded recoiling rope mechanism (16').

At both ends of the lift, curved blade assemblies (21) collapse the open parachutes before they round their turning points. The bullwheels (4) are fitted with rotating guide rods (22), which ensure that the collapsed parachutes won't get entangled. The distance between the ski slope (1) and the haul rope (3) determines the maximum diameter of the parachute (10). The vertical bars (12) and the recoiling rope mechanisms (16 and 16') with their respective grips (13 and 18) can traverse the shears (23) on the in-line towers (6) in a similar fashion to the carrier assemblies on a normally-configured ski lift.

To reduce cost, it is advisable to reuse the structures and the electric motor that drives the ski lift in normal operation for power generation, with the electric motor functioning as an electrical generator when the ski lift is configured for wind energy production. For example, the spring-loaded recoiling rope mechanism as found on surface lifts, can be utilized in opening and closing the parachutes.

When the carriers—the tow bars (T, J and platter type), chairs or gondolas—are replaced by the parachute assemblies on a one-to-one basis, in dimensioning the latter, the energy consumption of a single carrier can serve as a yardstick for the amount of energy a single parachute should produce. In the following calculation, it is assumed that the number of drogue parachutes equals the number of carriers that they replace. If the motor of the ski lift draws 27 kW moving 18 carriers, the energy consumption of a single carrier is 27 kW divided by 18, equals 1.5 kW. When the ski lift is reconfigured to produce the same amount of energy from the wind, the same number of parachutes, 18, is used. Since the power generated by a parachute can be calculated from the accepted "rule of thumb" 3.1 m$^2$/kW at a wind speed of 8 m/s [1], the surface area of a parachute needs to be 4.7 m$^2$. It follows that its diameter is 3 m.

Since the parachute assemblies move up and down the ski slope, fixed to the haul rope on opposite sides of the ski lift, their added weight poses no problems. The extra weight is eliminated with the same counterweight principle as employed in a traditional elevator, leading only to friction losses. Since the parachute assemblies weigh as much going upward as downward, better balancing is achieved than when the ski lift operates in its traditional role, in which the bars, chairs or gondolas always descend empty, without skiers.

On a ski slope the wind is blowing from the foot upwards for most of the time, but under certain climatic conditions or at certain times during the day the wind will blow down the slope instead. The invention autonomously adapts to either condition, as shown in FIG. 3A and FIG. 3B. In both figures, reference numbers 30 mark deploying parachutes. Similarly, numbers 31 point to fully deployed parachutes. Collapsing parachutes are marked with numbers 32. Fully collapsed parachutes are referenced by number 33. Arrow 34 indicates an uphill wind, while arrow 35 represents a downhill wind. It should be noted that the haul rope always turns in the same direction clockwise in FIG. 3A and FIG. 3B—regardless of the prevailing wind.

As many drogue parachutes can be anchored to the haul rope of a ski lift as space and strength of the construction permit. Their number can be equal or higher than that of carriers on a conventional ski lift.

In another embodiment of the invention, wind energy is harnessed using a sail structure similar to that on a sailboat. Also, rigid wingsail constructions that swivel or change shape can be used instead of a more conventional sail. A sail or wingsail has the advantage of better versatility in a wider variety of wind conditions. However, a drogue parachute solution appears to be the most economical and least complicated in use.

Some advantageous embodiments of the method and device according to the invention have been described above. The invention is however not limited to the embodiments described above, but the inventive idea can be applied in numerous ways within the scope of the claims.

REFERENCES

[1] The Nature of Boats: Insights and Esoterica for the Nautically Obsessed, Dave Gerr, McGraw Hill Professional, 1995, ISBN 007024233X, 9780070242333

The invention claimed is:

1. A system for harnessing wind power comprising,
a ski lift having a haul rope and carriers, wherein the ski lift is arranged to be modified by replacing the carriers at least partly by wind-catching structures that are arranged to move the haul rope when wind affects at least some of the wind catching structures,
wherein the haul rope is connected to a generator such that moving the haul rope is arranged to transfer mechanical energy to the generator which is arranged to produce electrical energy, and
wherein the generator is an electric motor of the ski lift.

2. The system according to claim 1, wherein the wind-catching structures are arranged to be foldable or otherwise modifiable when the haul rope (3) brings the wind-catching structures to a position where they are at least partly against the wind.

3. The system according to claim 2, wherein at both ends of the ski lift there is a bull wheel type structure and near the bull wheel type structures there are arrangements for closing the wind-catching structures before the haul rope brings the wind-catching structures around their turning points.

4. The system according claim 1, wherein the haul rope is arranged to move in one direction regardless of the wind direction and wherein the wind-catching structures are arranged to catch wind in a part of the haul rope that moves the haul rope in said direction.

5. The system according to claim 1, wherein the haul rope is arranged to move in both directions and the direction of the haul rope is the direction where the wind catching structures are arranged to catch wind power.

6. The system according to claim 1, wherein the wind catching structures are parachutes, sails, rigid wing sail constructions or combinations thereof.

7. The system according to claim 6, wherein the wind catching structures are parachutes and are arranged to be open when in a tailwind and to be closed when facing a headwind.

8. The system according to claim 1, wherein the wind-catching structures are arranged to go up in a first position, to go down in a second position or vice versa and the selection of the position depends on the direction of the wind.

9. A method for harnessing wind power comprising:
modifying a ski lift having a haul rope and carriers by replacing at least some of said carriers with wind-catching structures,
allowing at least some of the wind-catching structures to be moved by wind and to in turn move the haul rope, and
producing electricity through rotation of a generator by moving haul rope.

10. A system for harnessing wind power comprising,
a ski lift having a haul rope and a plurality of wind-catching structures attached thereto,
a bull wheel type structure at a top of the ski lift and another bull wheel type structure at the bottom of the ski lift, wherein the haul rope is configured to pass around both bull wheel type structures, and wherein movement of the haul rope is capable of turning both of the bull wheel type structures,
a generator, which includes an electric motor component of the ski lift, connected to one of the bull wheel type structure,
wherein the wind-catching structures are capable of moving the bull wheel type structures by moving the haul rope in response to a wind force, and
wherein the generator is capable of producing electric power based on the movement of the bull wheel type structures moved by the haul rope in response to the wind force.

* * * * *